United States Patent

(12) United States Patent
Chatigny

(10) Patent No.: US 8,542,971 B2
(45) Date of Patent: Sep. 24, 2013

(54) PACKAGES FOR HIGH POWER OPERATION OF OPTICAL FIBER COMPONENTS

(75) Inventor: Stéphane Chatigny, Saint-Rédempteur (CA)

(73) Assignee: Coractive High-Tech Inc., Quebec (Quebec) (CA)

( * ) Notice: Subject to any disclaimer, the term of this patent is extended or adjusted under 35 U.S.C. 154(b) by 135 days.

(21) Appl. No.: 13/001,335

(22) PCT Filed: Jun. 25, 2009

(86) PCT No.: PCT/CA2009/000889
§ 371 (c)(1),
(2), (4) Date: Dec. 23, 2010

(87) PCT Pub. No.: WO2009/155707
PCT Pub. Date: Dec. 30, 2009

(65) Prior Publication Data
US 2011/0110625 A1    May 12, 2011

Related U.S. Application Data

(60) Provisional application No. 61/075,473, filed on Jun. 25, 2008.

(51) Int. Cl.
*G02B 6/00* (2006.01)
(52) U.S. Cl.
USPC .......................................................... 385/134
(58) Field of Classification Search
None
See application file for complete search history.

(56) References Cited

U.S. PATENT DOCUMENTS

| | | |
|---|---|---|
| 3,944,328 A | 3/1976 | Kent et al. |
| 4,196,965 A | 4/1980 | Matsuno |
| 4,537,468 A | 8/1985 | Degoix et al. |
| 5,384,875 A | 1/1995 | Shannon et al. |
| 5,479,548 A | 12/1995 | Cote et al. |
| 6,681,068 B2 | 1/2004 | Goto et al. |
| 6,865,316 B1 | 3/2005 | Pratt |
| 7,373,070 B2 | 5/2008 | Wetter et al. |

(Continued)

FOREIGN PATENT DOCUMENTS

| | | |
|---|---|---|
| EP | 0078049 A2 | 5/1983 |
| FR | 2380559 A1 | 9/1978 |

(Continued)

OTHER PUBLICATIONS

Supplementary European Search Report issued in EP Patent Application No. 09768677 dated May 29, 2013.

*Primary Examiner* — Sung Pak
(74) *Attorney, Agent, or Firm* — McDermott Will & Emery LLP

(57) ABSTRACT

A package for dissipating heat power and/or optical power from an optical fiber component of a device is provided. The package includes a heat sink packaging receptacle for accommodating the optical fiber component having a cavity for receiving a temperature sensitive portion of the optical fiber component. According to one aspect, the package may include a power-dissipative material for dissipating heat power or optical power, the power-dissipative material extending within the cavity and surrounding the temperature-sensitive portion of the optical fiber component. According to another aspect, the package may include at least one channel extending between the cavity and an end of the heat sink packaging receptacle, the channel being in intimate contact with the cladding of the optical fiber component for dissipating heat power and/or optical power from the optical fiber component.

39 Claims, 7 Drawing Sheets

(56) References Cited

U.S. PATENT DOCUMENTS

| | | | |
|---|---|---|---|
| 2001/0016106 A1* | 8/2001 | Wagoner et al. | 385/140 |
| 2002/0131757 A1* | 9/2002 | Chan et al. | 385/140 |
| 2003/0103753 A1 | 6/2003 | Cabot et al. | |
| 2004/0165855 A1* | 8/2004 | Lee et al. | 385/137 |
| 2006/0062532 A1 | 3/2006 | Reith et al. | |
| 2007/0206909 A1* | 9/2007 | Wetter et al. | 385/92 |
| 2007/0217738 A1 | 9/2007 | Anderegg et al. | |
| 2009/0067795 A1* | 3/2009 | DiGiovanni et al. | 385/128 |
| 2011/0249935 A1* | 10/2011 | Hu | 385/27 |

FOREIGN PATENT DOCUMENTS

| | | |
|---|---|---|
| GB | 2315883 A | 2/1998 |
| JP | 2002-169053 A | 6/2002 |
| JP | 2007-271786 A | 10/2007 |
| WO | 2007/082387 A1 | 7/2007 |

* cited by examiner

High index acrylate (protective jacket) — 4
Low index polymer (pump guide cladding) — 3
Pump guide (signal guide cladding) — 2
Signal guide (gain medium) — 1

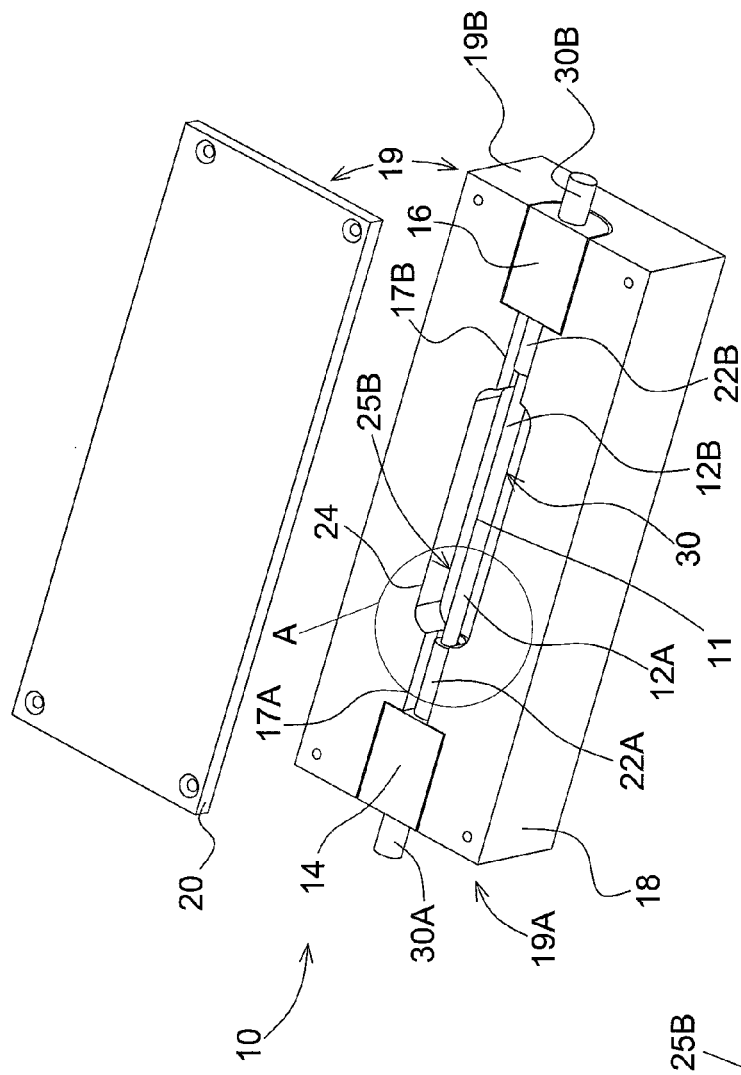
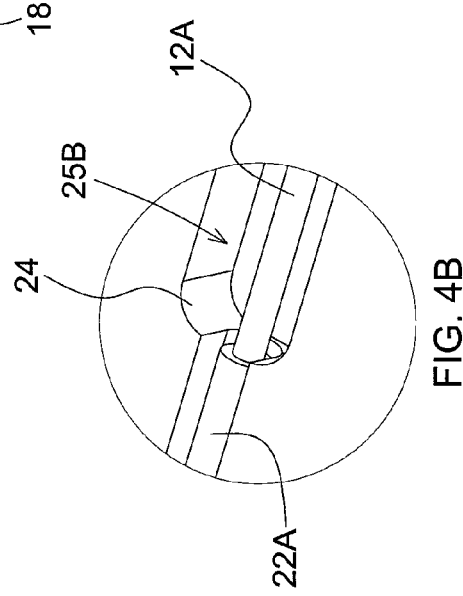
FIG. 4A
FIG. 4B

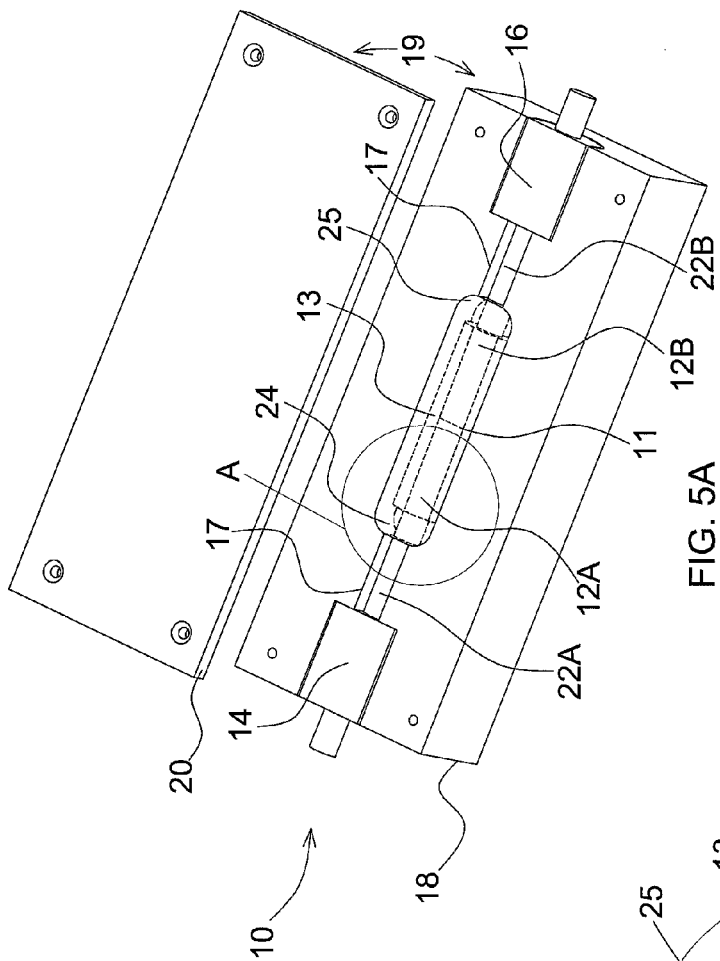
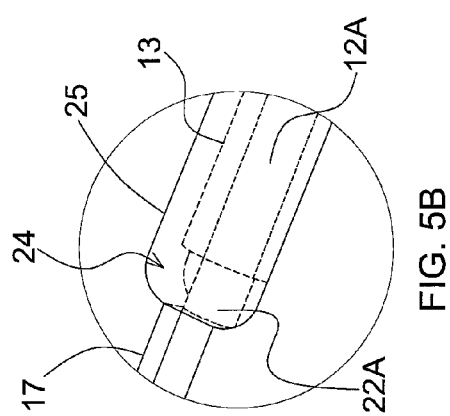

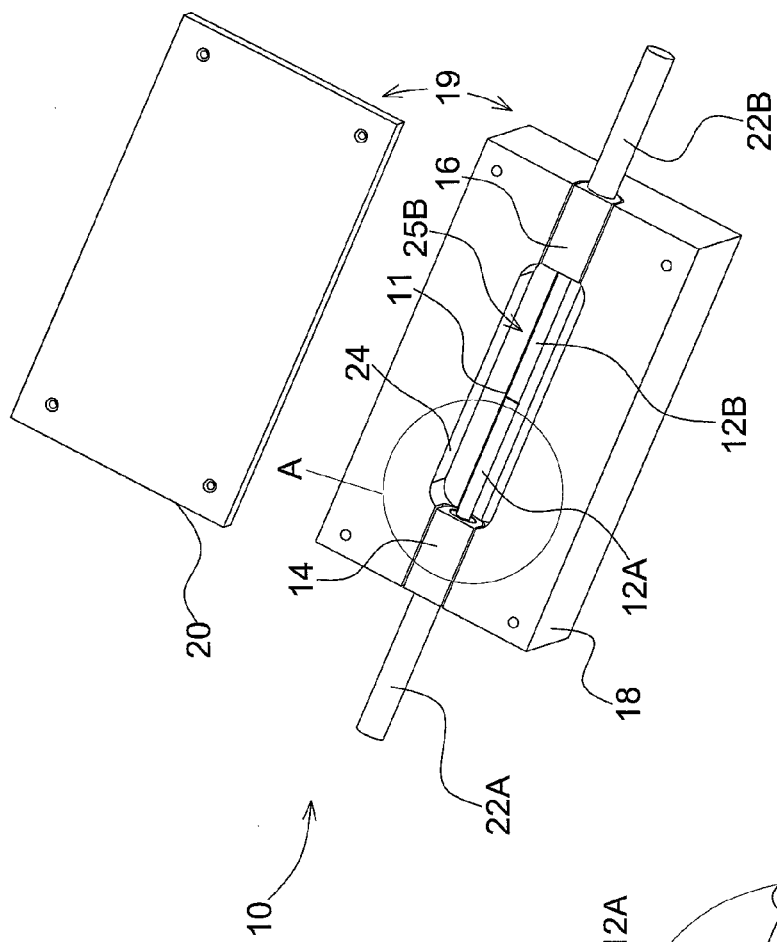
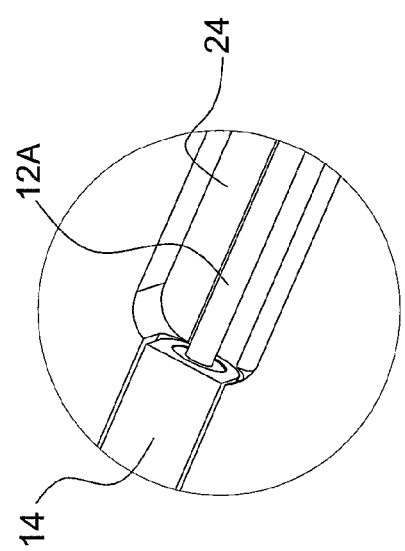
FIG. 6A
FIG. 6B

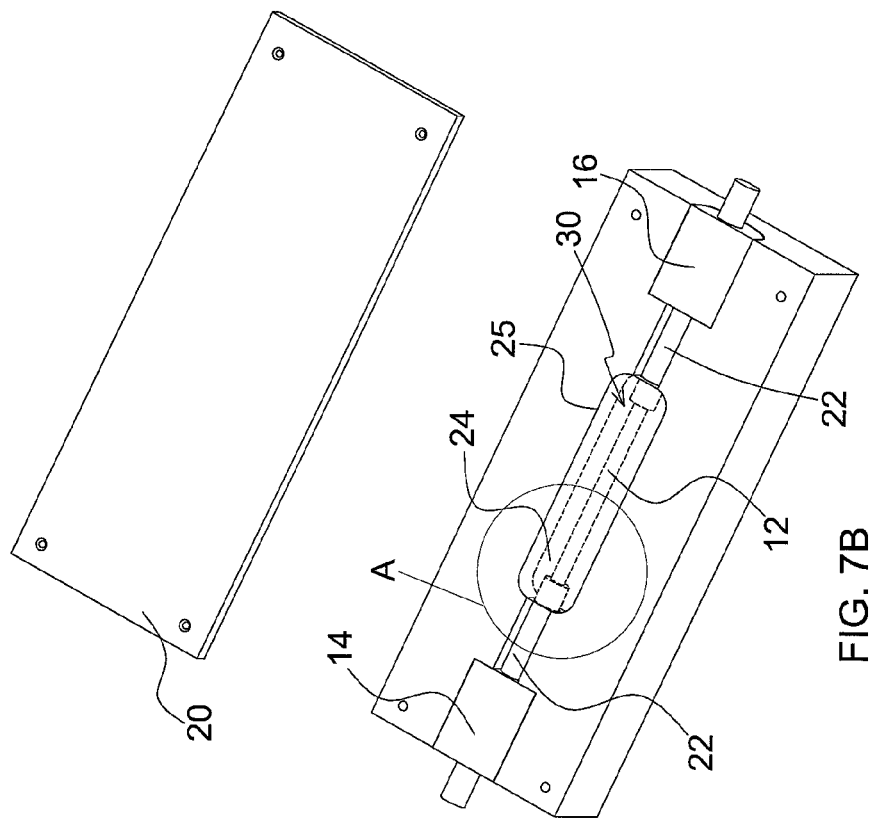
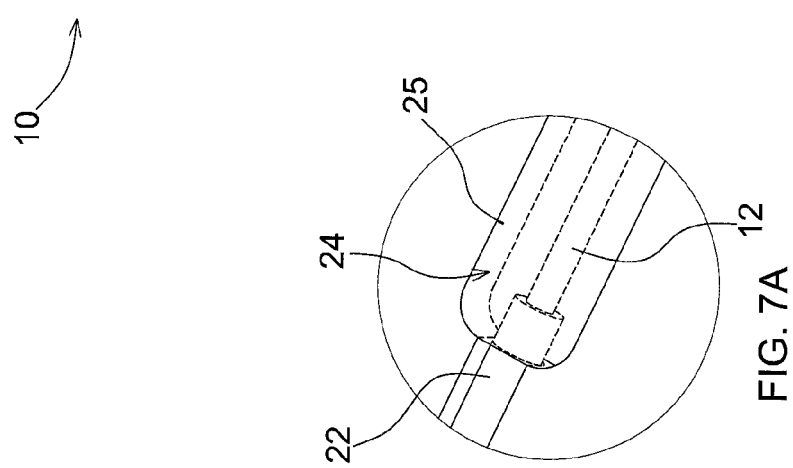

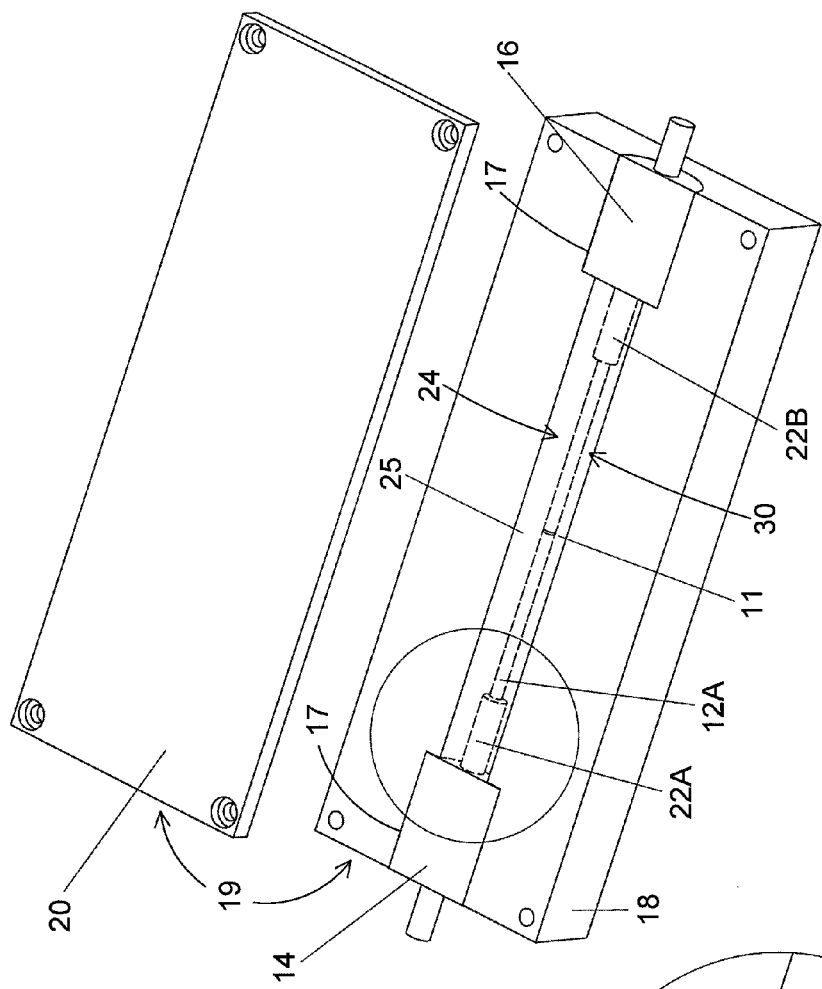
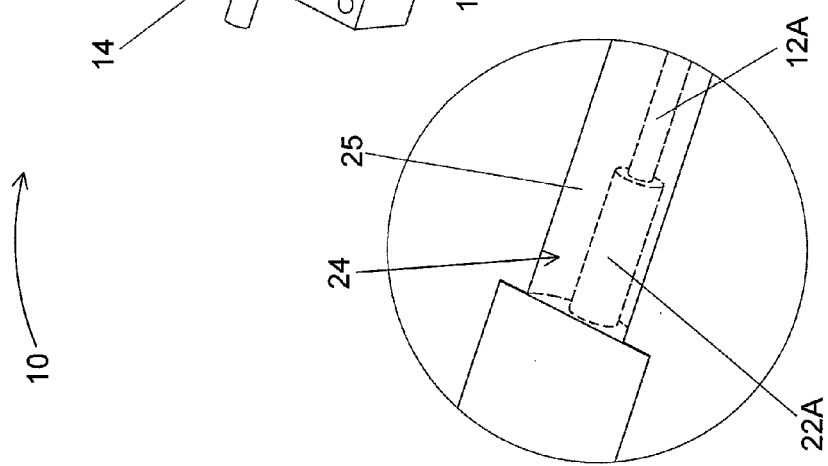
FIG. 8A
FIG. 8B

PACKAGES FOR HIGH POWER OPERATION OF OPTICAL FIBER COMPONENTS

RELATED APPLICATIONS

This application is the U.S. National Phase under 35 U.S.C. §371 of International Application No. PCT/CA2009/000889, filed on Jun. 25, 2009, which in turn claims the benefit of U.S. Application No. 61/075,473, filed on Jun. 25, 2008, the disclosures of which Applications are incorporated by reference herein.

FIELD OF THE INVENTION

The present invention relates to packages for optical fiber components. More particularly, it relates to packages for dissipating at least one of heat power or optical power from an optical fiber component of a device.

BACKGROUND OF THE INVENTION

Fiber lasers are becoming the laser of choice in numerous industrial applications. More and more, these applications require the laser to emit at the kilowatt power level which puts a strain on the power handling capabilities of laser components. A key element of this revolution, is the development of double clad optical fibers (DCOF), presented in FIG. 1. These fibers serve as brightness converters between low brightness/low beam quality multimode pump diodes and the high brightness/high beam quality signal coming out of the signal guide 1.

One of the most common causes of failure in fiber lasers is the thermal degradation of the pump guide's 2, low index polymer pump guide cladding 3 and of the high index acrylate protective jacket 4 at the junctions of the fibers. At these junctions, the optical perturbation from splicing the fibers transfers some of the optical power into modes that are no longer guided by the fiber waveguide structure. While excess loss of the splice may be guided by the glass-air interface of the uncoated fiber after the splice, any light traveling at a numerical aperture superior to the numerical aperture of the low index polymer is immediately stripped as it reaches the coated fiber interface and absorbed in the low index polymer 3 and acrylate protective jacket 4. In turn, the resulting excessive heating may cause thermal degradation to the fiber's low index polymer 3 and to the acrylate protective jacket 4, rendering them even more absorptive to light, ultimately causing the splice to burn or melt and triggering a catastrophic failure of the fiber laser. U.S. Pat. No. 6,515,994 by Di Giovanni et al. describes a technique for detecting thermal power emanating from a fiber splice as a result from absorption of the light carried by the fiber.

Another common mode of failure in fiber lasers occurs in the first few centimeters of the amplifying fiber after the entry point of the pump power. In the doped fiber core, quantum defect result in pump radiation being converted into heat in the glass host matrix. For example, the lasing of ytterbium ions is accompanied by about 20% conversion of the pump power into heat. The associated temperature rise of the fiber core in turn leads to a temperature increase of the low index polymer 3 and the fiber's acrylate protective jacket 4. Lifetime studies on acrylate fiber coatings have suggested maintaining the coating temperature below about 80° C. Consequently, commercial high power fiber lasers often have to be designed to avoid such problems by distributing the pump power at a number of entry points, thus preventing that the coating temperature exceeds its operating temperature.

FIG. 2 depicts exemplary optical fiber components of an optical fiber device and indicates possible sites of catastrophic failures due to thermal degradation.

U.S. Patent Application Publication No. 2007/0206909 by Wetter et al. describes an optical fiber component package for high power dissipation. FIG. 3 shows such a package 10' for an optical fiber device 12' according to Wetter. The optical fiber component package has a high thermal conductivity packaging substrate, 18' and 20', surrounding the optical fiber device 12' and has adhesive bonds, 14' and 16', at each end anchoring the optical fiber device to the substrate. The adhesive bonds are made of a material that has high transparency in damp heat as well as a high glass transition temperature and is capable of withstanding temperatures of over 100° C. However, the proposed adhesives in Wetter et al. are poor thermal conductors, which can cause thermal degradation and failure. The fact that adhesive bonds are a common cause of thermal failure has been identified in F. Séguin at al., *Tapered fused bundle coupler package for reliable high optical power dissipation*, Fiber Lasers III: Technology, Systems, and Applications, Proceedings of SPIE Vol. 6102, 2006. Ideally, the adhesive bond should be a good thermal conductor and be optically transparent. However, to the knowledge of the inventor, adhesive material that is simultaneously a good thermal conductor and optically transparent is not currently available.

In view of the above, there remains a need for a simplified device for preventing thermal degradation of optical fiber components under high power operation.

SUMMARY OF THE INVENTION

In accordance with a first aspect of the invention, there is provided a package for dissipating at least one of heat power or optical power from an optical fiber component of a device, the package including:
  a heat sink packaging receptacle for accommodating the optical fiber component, the heat sink packaging receptacle comprising:
    a cavity for receiving a temperature sensitive portion of the optical fiber component;
    a first end for accommodating an input end of the optical fiber component; and
    a second end for accommodating an output end of the optical fiber component; and
  a power-dissipative material for dissipating at least one of heat power or optical power, the power-dissipative material extending within the cavity and surrounding the temperature-sensitive portion of the optical fiber component, the power-dissipative material being in a solid or liquid form.

According to an embodiment, the power-dissipative material may include optically transparent material having a refractive index conducive to total-internal reflection optical guidance of light within the optical fiber component. According to another embodiment, the power-dissipative material may include optically transparent material for mode stripping having a refractive index equal to or greater than a refractive index of the temperature-sensitive portion of the optical fiber component. According to yet another embodiment, the power-dissipative material may include a heat conducting material.

The heat sink packaging receptacle may include at least one channel extending between the cavity and either the first end or the second end of the heat sink packaging receptacle, the channel being in intimate contact with a cladding of the optical fiber component for dissipating at least one of heat power or optical power from the optical fiber component.

The package may include an adhesive proximate each of the first end and the second end of the heat sink packaging receptacle for affixing the optical fiber component to the heat sink packaging receptacle.

The heat sink packaging receptacle preferably includes a heat sink substrate and a heat sink cover engaged in substantially mating relation to define the cavity.

In accordance with a second aspect of the invention, there is provided a package for dissipating at least one of heat power or optical power from an optical fiber component of a device, the optical fiber component having a light-guiding core and a cladding surrounding the core. The package includes a heat sink packaging receptacle for accommodating the optical fiber component, the heat sink packaging receptacle including:
- a cavity for receiving a temperature-sensitive portion of the optical fiber component;
- a first end for accommodating an input end of the optical fiber component;
- a second end for accommodating an output end of the optical fiber component; and
- at least one channel extending between the cavity and any one of the first end and the second end, the channel being in intimate contact with the cladding of the optical fiber component for dissipating at least one of heat power or optical power from the optical fiber component.

The package may include an adhesive for affixing the optical fiber component to the heat sink packaging receptacle, the adhesive placed at an adhesive bond site that is located within the channel distal to the cavity. The adhesive may have a refractive index greater than a refractive index of the cladding of the optical fiber component. The adhesive is preferably optically transparent and temperature resistant.

The cavity may include heat-insensitive gas surrounding the temperature-sensitive portion of the optical fiber component.

The cavity may contain a power-dissipative material for dissipating at least one of heat power or optical power, the power-dissipative material surrounding the temperature sensitive portion of the optical fiber component.

The temperature-sensitive portion of the optical fiber component receivable by the cavity may be stripped of the cladding.

The heat sink packaging receptacle preferably includes a heat sink substrate and a heat sink cover engaged in substantially mating relation to define the cavity.

In accordance with a third aspect of the invention, there is provided a method of packaging a high-power optical fiber component of a device for dissipating at least one of heat power or optical power therefrom. The method includes the steps of:
- inserting the optical fiber component into a heat sink substrate having a cavity for receiving a temperature sensitive portion of the optical fiber component;
- introducing a power-dissipative material inside the cavity, the power-dissipative material extending within the cavity and surrounding the temperature sensitive portion of the optical fiber component for dissipating at least one of heat power or optical power therefrom the power-dissipative material being in a solid or liquid form; and
- placing a heat sink cover in substantially mating relation with the heat sink substrate thereby enclosing the optical fiber component and packaging the optical fiber component.

The step of introducing a power-dissipative material inside the cavity may include liquid filling the power-dissipative material into the cavity and solidifying in place the power-dissipative material.

The method may further include the step of fixing the optical fiber component to the heat sink substrate using adhesive at an adhesive bond site proximate an end of the heat sink substrate.

The method may further include a step, before the step of inserting the optical fiber component, of recoating a previously uncoated section of the temperature-sensitive portion of the optical fiber component.

In accordance with a fourth aspect of the invention, there is provided a method of packaging a high-power optical fiber component of a device for dissipating at least one of heat power or optical power therefrom, the optical fiber component having a light-guiding core and a cladding surrounding the core. The method includes the steps of:
- inserting the optical fiber component into a heat sink substrate having a cavity for receiving a temperature-sensitive portion of the optical fiber component and having at least one channel that extends between the cavity and an end of the heat sink substrate for receiving an end portion of the optical fiber component, the end portion being in intimate contact with the channel for dissipating at least one of heat power or optical power from the end portion of the optical fiber component; and
- placing a heat sink cover in substantially mating relation with the heat sink substrate thereby enclosing the optical fiber component and packaging the optical fiber component.

The step of inserting the optical fiber component preferably includes positioning the optical fiber component such that the cladding of the optical fiber component does not extend into the cavity.

The method of packaging may further include the step of fixing the optical fiber component to the heat sink substrate using adhesive at an adhesive bond site that is located within the channel distal to the cavity.

According to an embodiment, the method may further include the step of introducing a heat-insensitive gas into the cavity.

According to another embodiment, the method may include the step of introducing a power-dissipative material into the cavity, the power-dissipative material extending within the cavity and surrounding the temperature sensitive portion of the optical fiber component for dissipating at least one of heat power or optical power therefrom. The step of introducing a power-dissipative material inside the cavity may include liquid filling the power-dissipative material into the cavity and solidifying in place the power-dissipative material.

The method may further include the step, before the step of inserting the optical fiber component, of recoating a previously uncoated section of the temperature-sensitive portion of the optical fiber component.

Other features and advantages of the present invention will be better understood upon reading of preferred embodiments thereof with reference to the appended drawings.

BRIEF DESCRIPTION OF THE DRAWINGS

For a better understanding of the invention and to show how the same may be carried into effect, reference is now made by way of example to the accompanying drawings in which:

FIG. 4A shows a first preferred embodiment of the present invention; FIG. 4B is a detail view of portion A of FIG. 4A.

FIG. 5A shows a second preferred embodiment of the present invention; FIG. 5B is a detail view of portion A of FIG. 5A.

FIG. 6A shows a third preferred embodiment of the present invention; FIG. 6B is a detail view of portion A of FIG. 6A.

FIG. 7A shows a fourth preferred embodiment of the present invention; FIG. 7B is a detail view of portion A of FIG. 7A.

FIG. 8A shows a fifth preferred embodiment of the present invention; FIG. 8B is a detail view of portion A of FIG. 8A.

DETAILED DESCRIPTION OF THE INVENTION

Figure 1:
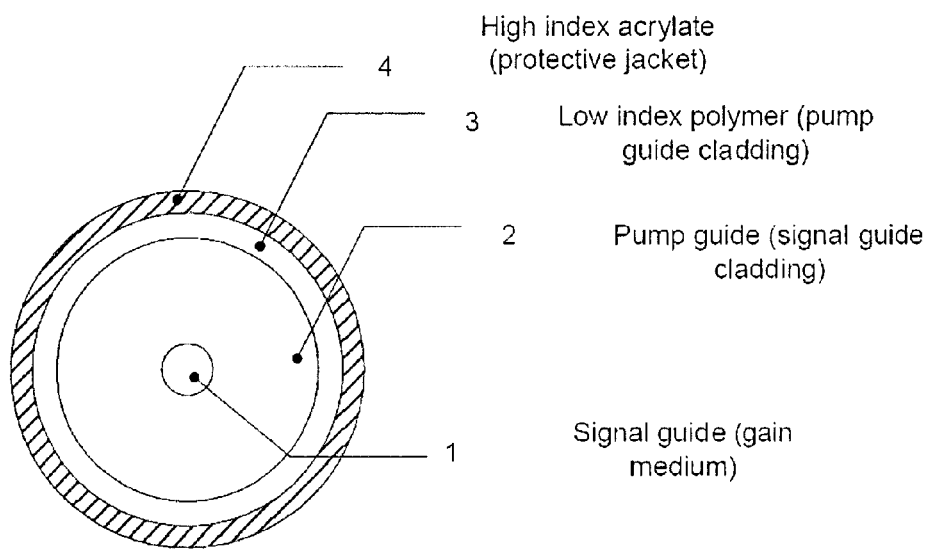
FIG. 1 (PRIOR ART) shows a typical double clad optical fiber.

The present invention will be described more fully hereinafter with reference to the accompanying drawings, and more specifically with reference to FIGS. 4A to 8B, in which like numerals refer to like elements throughout.

It will be understood by one skilled in the art that the embodiments below are given by way of example only and that the characteristics given are in no way limitative to the scope of the present invention.

Package for Optical Fiber Component

Referring to FIGS. 4A to 8B, the present invention provides a package 10 for dissipating at least one of heat power or optical power from an optical fiber component of a device to advantageously prevent or limit degradation of the optical fiber component and thereby maintain overall performance of the component and device.

Throughout the present application, the term "power" is understood to refer generally to the rate at which energy is transmitted. Heat is the transfer of energy from one body or system to another due to a difference in temperature; "heat power" therefore refers to the rate of transfer of energy between such bodies or systems. This heat transfer may occur via conduction (atomic interaction), radiation (emission of electromagnetic radiation), and convection (combined effect of conduction and fluid flow). On the other hand "optical power", sometimes also also called "radiant power", is generally used to refer to the average rate of energy transport by electromagnetic radiation, i.e. to the amount of light energy transported per unit time, for example, to the power of light present at a location in an optical fiber.

It should be noted that the terms cladding and coating are used interchangeably herein to refer to a layer surrounding a light-guiding core of an optical fiber.

Optical Fiber Component

The optical fiber component may include, but is not limited to, an optical fiber, a splice between optical fibers, a fiber Bragg grating (FBG), a gain fiber, a pump combiner, a fiber taper or a mode field adaptor, a signal and pump combiner such as a tapered fiber bundle (TFB), a beam delivery fiber, etc. or any combination thereof. The term "optical" used herein refers to the electromagnetic spectrum and is not limited to the visible portion of the electromagnetic spectrum.

Heat Sink Packaging Receptacle

The package includes a heat sink packaging receptacle for accommodating the optical fiber component. As seen in the exemplary embodiment of the package illustrated in FIG. 4A, the heat sink receptacle 19 has a cavity 24 for receiving a temperature-sensitive portion of the optical fiber component 30 and preferably includes a heat sink substrate 18 and a mating heat sink cover 20.

The cavity 24 may be a hollow section within the heat sink packaging receptacle 19 shaped and sized to accommodate the temperature-sensitive portion of the optical fiber component 30.

The temperature-sensitive portion of the optical fiber component 30 may be a portion of the optical fiber component that is prone to or the cause of overheating and thus thermal degradation of the optical fiber component or of the device associated with the optical fiber component, for example a fiber section stripped of its coating, a fiber splice or a section of amplifying fiber after the entry point of the pump power. Optical power loss at a fiber junction such as a fiber splice can result in energy transfer from guided light modes in the core of the fiber to radiation modes in the cladding and hence excessive heating of the cladding resulting in thermal degradation of the cladding. The section of amplifying fiber after the entry point of the pump power also generates heat due to the quantum defect associated with the conversion of a pump photon into a signal photon. This heat dissipates out of light guiding fiber core by thermal conduction and in turn heats up the fiber coating. At a certain level, the heat will induce a permanent degradation of the mechanical and optical properties of the fiber coating.

Therefore, the temperature-sensitive portion is in direct or indirect contact with the material of the heat sink packaging receptacle to allow for the conduction of excess heat from the temperature sensitive portion—the heat sink packaging receptacle 19 thereby serving to protect the optical fiber component from the excess heat. As such, the heat sink packaging receptacle 19 is preferably of good heat conductivity. It preferably consists of a heat conductive metal, metallic alloy, or composite material. To facilitate the fabrication of the heat sink packaging receptacle 19, the heat sink packaging receptacle 19 is preferably made of easily machinable materials such as, but not limited to, aluminum or copper. Advantageously, the heat sink substrate 18 and cover 20 also serve as mechanical protection for the optical fiber component.

Power-dissipative Material

According to one aspect of the invention, the package may include a power-dissipative material for dissipating heat power and/or optical power. It should be understood that the dissipation of power includes the (passive or active) attenuation, dispersal, removal and/or extraction, and control of power, and hence the power-dissipative material may be used for attenuating (including for example preventing or minimizing heat power and optical power loss), dispersing, removing, extracting and otherwise controlling power.

The power-dissipative material extends within the cavity and surrounds the temperature-sensitive portion of the optical fiber component. The power-dissipative material may fill the entire cavity or only a portion thereof. Advantageously, the power-dissipative material 25 can serve as a means of affixing the optical fiber component 30 to the heat sink packaging receptacle 19.

An exemplary embodiment of the package in which a power-dissipative material may be used to dissipate, attenuate or remove, optical power is illustrated in FIGS. 8A and 8B. In this embodiment, the package is used to protect a temperature-sensitive portion surrounding optical fiber splice 11 between two optical fibers 12A and 12B. The portions of optical fibers 12A and 12B immediately adjacent to the splice 11 have been uncoated during the splice preparation process. Cavity 24 may be filled with a power-dissipative material 25 that includes optically transparent material having a refractive index conducive to light guidance within the optical fiber component via total-internal reflection thereby minimizing optical loss and detrimental heat generation. Hence the optically transparent material preferably has a refractive index lower or equal to a refractive index of a cladding or coating of the optical fibers 12A and 12B. This allows for the light propagating inside the core within the coated fibers to continue to be guided by the core of the fibers 12A and 12B and any excess heat in the cladding or coating 22A and 22B of fibers 12A and 12B to be dissipated away. Alternatively, cavity 24 may be filled with a power-dissipative material 25 that includes an optically transparent material surrounding the temperature-sensitive portion for stripping, i.e. radiating, away light, for example, stripping cladding light resulting from excess power injected into the cladding 22A of the optical fiber 12A, removing higher order mode light from the cores of fiber 12A and 12B, radiating away optical power loss at the site of fiber splice 11. The optically transparent material has a refractive index equal to or greater than a refractive index of the temperature-sensitive portion of the optical fiber component. Also alternatively, the power-dissipative material 25 may have an absorption capacity to absorb light travelling within the optical fiber component, for example to absorb optical power leaks at the site of fiber splice 11 resulting from the light signal traveling from fiber 12A to 12B. Gallium exhibits such an absorption capacity and may serve as such a power-dissipative material.

The power-dissipative material may include a heat conducting material such as a metal, metallic alloy or composite. The heat conducting material should have a good thermal conductivity. The heat conducting material may be introduced into the cavity in liquid form and allowed to solidify in place. The heat conducting material preferably has a low melting point so as to avoid damaging the optical fiber component in the cavity during the liquid-filling of the heat conducting material. As seen in FIGS. 7A and 7B, in order to remove excess pump power from the pump cladding, clad fiber 22 has been placed in the cavity 24 and a portion of the pump cladding has been removed therefrom. The power-dissipative material 25, in this case a good heat conductor, is introduced into the cavity. The uncoated fiber 12 is thus placed in contact with the heat conductor. The heat conductor absorbs the excess pump cladding power entering the cavity 24 from the cladding of fiber 22 and the heat generated therefrom thereby reducing the amount of pump power and heat transmitted to the pump cladding of fiber 22 at the other end.

Channel

According to another aspect of the invention, the heat sink packaging receptacle may include at least one channel extending between the cavity and an end of the heat sink packaging receptacle, the channel being in intimate contact with a cladding of the optical fiber component for dissipating heat power and/or optical power from the optical fiber component.

The channel need not be in intimate contact with the cladding all along the channel, but the longer the contact length the better the power dissipation. As seen for example in FIGS. 4A and 4B, the channel may be a groove in the heat sink substrate 18 further defined by the heat sink cover 20. It need not be of uniform diameter throughout its length, its length varying to accommodate the placing of the optical fiber component 30 therein. Preferably, the heat sink packaging receptacle 19 includes an entry channel 17A and an exit channel 17B. The entry channel 17A extends between a first end 19A of the heat sink packaging receptacle 19 and the cavity 24 and is in intimate contact with an input end 30A of the optical fiber component for dissipating heat power and/or optical power from the input end 30A of the optical fiber component 30. Similarly, the exit channel 17B extends between a second end 19B of the heat sink packaging receptacle 19 and the cavity 24, and is in intimate contact with the output end 30B of the optical fiber component 30 for dissipating heat power and/or optical power from the output end of the optical fiber component 30.

The package 10 may include an adhesive located at an adhesive bond site 14 and 16 proximate the ends 19A and 19B of the heat sink packaging receptacle 19 for affixing the optical fiber component 30 to the heat sink packaging receptacle 19 and preferably distal to the cavity 24 containing the temperature-sensitive portion of the optical fiber component 30. In this way, any heat absorbed at the site of the adhesive is distanced from the temperature-sensitive portion to prevent causing heat damage to the temperature-sensitive portion. Also preferably, the adhesive used is transparent and temperature resistant so as to advantageously dissipate heat from the outer layer (coating/cladding) of the optical fiber component 30 to the heat sink packaging receptacle 19. The adhesive may further have a refractive index greater than a refractive index of the cladding/coating of the optical fiber component so as to strip out unwanted optical power from the outer layer (coating/cladding) of the optical fiber component 30.

Advantageously, in the case where the cavity is simply filled with temperature insensitive gas 25B such as air or an inert gas as nitrogen—gas being a less than ideal conductor of heat, the channel(s) 17' provide needed power dissipation at the input and/or output ends 30A and 30B of the optical fiber component 30.

Exemplary Embodiments

Several exemplary embodiments of the package according to the present invention are illustrated in FIGS. 4A to 8B and are discussed hereinbelow.

Figure 2:
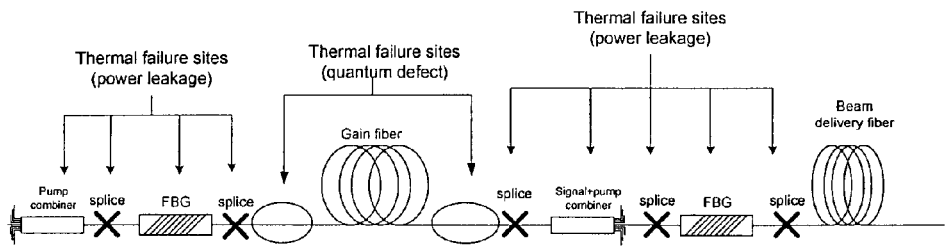
FIG. 2 (PRIOR ART) shows exemplary optical fiber components of an optical fiber device and possible sites of catastrophic failures due to thermal degradation.
Figure 3:
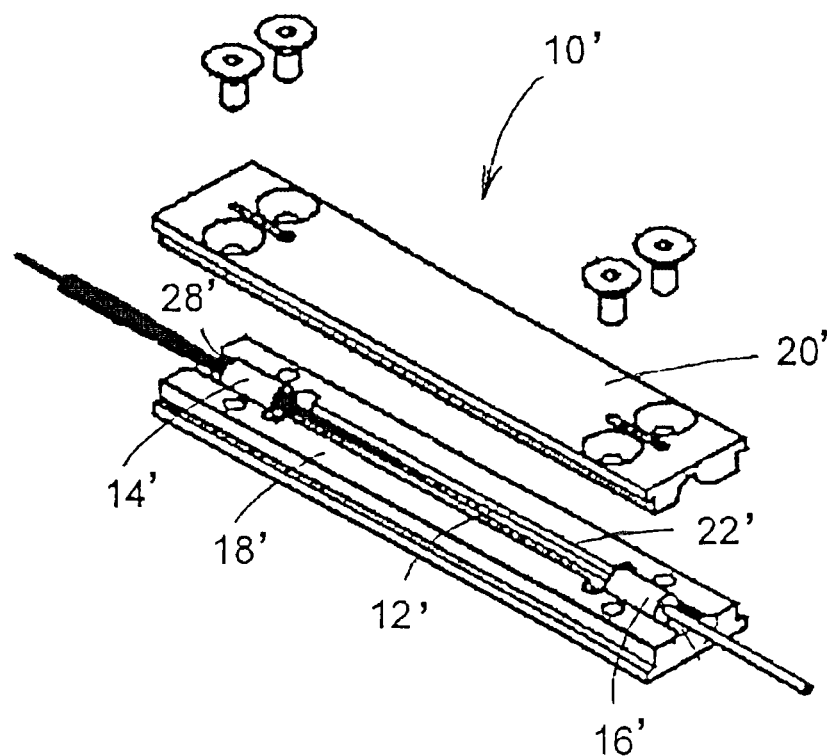
FIG. 3 (PRIOR ART) shows a perspective view of a prior art package for an optical fiber component.

An optical fiber package according to a first preferred embodiment of the present invention is shown in FIGS. 8A and 8B. The package 10 includes a heat sink packaging receptacle 19, which consists of a heat sink substrate 19 and a mating heat sink cover 20, for accommodating an optical fiber component 30. Heat sink receptacle 19 serves to protect the optical fiber component 30 from excess heat generated by the component. By having the optical fiber component 30 in direct or indirect contact with the heat sink receptacle 19, excess heat is dissipated away from the component via conduction of heat. Heat sink receptacle 19 has a cavity 24 for receiving a temperature-sensitive portion of the optical fiber component 30. It may include at least one channel 17 leading to the cavity 24 for receiving an optical fiber (12A and 12B) of the optical fiber device component 30. The package is used to protect an optical fiber component 30 and more specifically a temperature-sensitive portion surrounding optical fiber splice 11 between two optical fibers, 12A and 12B. It should be noted that the portions of optical fibers 12A and 12B immediately adjacent to the splice 11 are left uncoated in this embodiment. Cavity 24 Is filled with a power-dissipative material 25 that is an optically transparent material having a refractive index lower or equal to a refractive index of a cladding or coating 22A and 22B of the optical fibers 12A and 12B (for example, in the case of a typical fiber such as the one shown in FIG. 2, the refractive index is lower than or equal to a refractive index of the low index polymer 3 of the pump guide cladding) to ensure that the optical energy, i.e. light, travelling within the optical fibers 12A and 12B remains within the fibers and to attenuate/reduce the amount of heat power generated. (The section of the optical fiber component 30 located within the cavity 24 is shown in phantom line to illustrate the presence of the power-dissipative material 25.) The power-dissipative material 25 may be a UV curable low index polymer such as SSCP PC 373 or DSM Desotech Desolite DF0007 or an epoxy such as AngstromBond EX1128. The optical fiber component is fixed to the heat sink substrate 18 using adhesive at adhesive bond sites 14 and 16 to affix thereto the portions of the optical fibers 12A and 12B provided with coatings 22A, 22B respectively. The adhesive used may be an optical epoxy having a high index of refraction, such as Epoxy technology 353ND compound, for example. The adhesive bond sites 14 and 16 are placed sufficiently far away from the heat sensitive sections of the optical fiber component 30 (splice 11 and surroundings) to allow proper heat extraction in the heat sink receptacle 19. Alternatively the power-dissipative material 25 itself could be used to fix the fiber in the heat sink packaging receptacle 19. In such embodiment the adhesive bond sites 14 and 16 need not be present. The optical fiber package can also be equipped with active heat sinking (not illustrated) such as, but not limited to, thermo-electric coolers (TEC).

With reference to FIGS. 5A and 5B, an optical fiber package according to a second preferred embodiment of the present invention is shown. The optical fiber package 10 includes a heat sink receptacle 19, having a heat sink substrate 18 and a mating heat sink cover 20, preferably of good heat conductivity and made of easily machinable materials such as, but not limited to, aluminum or copper. The package is used to protect an optical fiber splice 11 (shown in phantom line) between two optical fibers 12A and 12B (shown in phantom line at the location of the splice). The fibers 12A and 12B, previously uncoated in the preparation process of optical fiber splice 11, are recoated with a recoat material 13 such as, but not limited to, a UV curable low index polymer. The UV curable low index polymer used may be SSCP PC 373 or DSM Desotech Desolite DF0007, for example. The optical fibers are fixed to the heat sink 18 at adhesive bond sites 14 and 16 using an adhesive that is preferably both optically transparent and heat resistant. The adhesive bond sites are placed sufficiently far away from the heat sensitive sections of the optical fiber component to allow proper heat extraction in the heat sink 18, for example they are placed at the ends of the channels 17 distal to the cavity 24, In order to dissipate heat in the recoat material 13 and in the coatings 22A and 22B of the optical fibers 12A and 12B respectively, cavity 24 is filled with a power-dissipative material 25 that is a good heat conductor. (The section of the optical fiber component 30 located within the cavity 24 is shown in phantom line to illustrate the presence of the power-dissipative material 25.) The heat conducting material may be made of a metal, metallic alloy or any appropriate composite. In order to fill the cavity 24 with the heat conductor, the heat conductor may first be heated beyond its melting point and poured to fill the cavity 24. The heat conductor is then allowed to cool and solidify within the cavity 24. As such, the heat conductor is preferably one that has a low melting point, for example gallium, so as to prevent any damage to the temperature sensitive splice 11 from the liquid conductor.

With reference to FIGS. 4A and 4B, an optical fiber package according to a third preferred embodiment of the present invention is shown. The optical fiber package 10 a heat sink receptacle 19, having a heat sink substrate 18 a heat sink receptacle 19 for accommodating an optical fiber device component and conducting heat away from the optical fiber device component and a mating heat sink cover 20 for enclosing the optical fiber device within the heat sink receptacle 19. Heat sink receptacle 19 has a cavity 24 for receiving a temperature-sensitive component of the optical fiber component 30, and includes an entry channel 17A and an exit channel 17B. The entry channel 17A extends between a first end 19A of the heat sink packaging receptacle 19 and the cavity 24 and is in intimate contact with an input end 30A of the optical fiber component for dissipating heat power and/or optical power from the input end 30A of the optical fiber component. Similarly, the exit channel 17B extends between a second end 19B of the heat sink packaging receptacle 19 and the cavity 24, and is in intimate contact with the output end 30B of the optical fiber component 30 for dissipating heat power and/or optical power from the output end of the optical fiber component 30. Heat sink substrate 18 and heat sink cover 20 serve to protect the optical fiber device component from excess heat generated by the component by dissipating the excess heat away from the component. As such the heat sinks 18 and 20 are preferably of good heat conductivity and made of easily machinable materials such as, but not limited to, aluminum or copper. Advantageously, the heat sink receptacle and cover also serve as mechanical protection for the optical fiber device component. The package is used to protect an optical fiber device component 30 and more specifically an optical fiber splice 11 between two optical fibers 12A and 12B. It should be noted that the portions of optical fibers 12A and 12B immediately adjacent to the splice 11 are uncoated. In order to dissipate heat in the optical fiber coatings 22A and 22B of fibers 12A and 12B, the coated portions of the fibers are located in sufficiently long channels 17A and 17B found within heat sink substrate 18, such channels being in intimate contact with the coatings to promote adequate heat exchange between them. Preferably, no part of the fiber's coating 22A and 22B should protrude from the channels of the heat sink 18 into the cavity 24. Cavity 24 is filled with air or any heat insensitive gas 25B such as an inert gas e.g. nitrogen. The optical fiber component is fixed to the heat sink substrate 18 using adhesive at adhesive bond sites 14 and 16 to fix the coated portions of the optical fibers 12A and 12B at the ends of channels 17A and 17B most distal to the cavity 24. The adhesive used may be an optical epoxy such as Epoxy technology 353ND compound, for example. The adhesive bond sites 14 and 16 are placed sufficiently far away from the cavity 24 to allow proper heat extraction in the channels 17A and 17B of the heat sink receptacle 19.

With reference to FIGS. 6A and 6B, an optical fiber package according to a fourth preferred embodiment of the present invention is shown. The optical fiber package 10 includes a heat sink packaging receptacle 19, which has a heat sink substrate 18 and a heat sink cover 20, preferably made of easily machinable good heat conducting materials such as, but not limited to, aluminum or copper. The package is used to protect an optical fiber splice 11 between two optical fibers, 12A and 12B. In order to dissipate heat in the optical fiber coatings, 22A and 22B, the coated fibers are located in sufficiently long channels 17 within heat sink substrate 18, where the coated fibers are fixed within the channels 17 at the ends of the channels 17 located furthest from the cavity using high refractive index optical adhesive at adhesive bond sites 14 and 16 respectively. The high refractive index optical adhesive has a refractive index greater than the refractive index of the polymer coating of the optical fiber and acts as a mode stripper for the optical power propagating in the coating. Preferably, the high refractive index optical adhesive is highly transparent, highly temperature resistant, and of minimal thickness. In the preferred embodiment, the optical adhesive used may be Epoxy technology #353ND, for example. Cavity 24 is filled with air or any heat insensitive gas 25B such as, but not limited to, nitrogen.

With reference to FIGS. 7A and 7B, an optical fiber package, for removing excess optical power, according to a fifth preferred embodiment of the present invention is shown. The optical package may be used to remove, for example, a portion of the light signal and/or amplified spontaneous emission (ASE), and/or the unabsorbed residual pump power. As with the previous exemplary embodiments, the optical fiber package 10 includes a heat sink packaging receptacle 19, which has a heat sink substrate 18 and a heat sink cover 20, preferably made of easily machinable good heat conducting materials such as, but not limited to, aluminum or copper. The package 10 is used to remove excess pump power from an optical fiber component 30. In order to remove the excess pump power, a length of the coating is removed from the fiber. The uncoated region 12 of the fiber is placed within cavity 24 and the cavity is filled with a power-dissipative material 25, more specifically with a low-temperature melting point heat conductor such as, but not limited to, gallium. (It should be noted that the section of the optical fiber component 30 located within the cavity 24 is shown in phantom line to illustrate the presence of the power-dissipative material 25.) Alternatively, the uncoated region 12 could be recoated with a polymer of index of refraction equal to or higher than the pump guide refractive index. In the preferred embodiment, the polymer used may be DSM Desotech DSM-950-200, for example. In order to fill the cavity 24 with the heat conductor, the heat conductor is first heated beyond its melting point and poured in the cavity 24. The heat conductor is then allowed to cool and become solid again. In order to improve the power extraction efficiency from the optical fiber component, the fiber path could also be made curvilinear to introduce bending losses. The optical fiber component is fixed to the heat sink substrate 18 using adhesive at adhesive bond sites 14 and 16.

Method of Packaging

In accordance with an aspect of the present invention, there is also provided a corresponding method of packaging the optical fiber component of the device for dissipating at least one of heat power or optical power therefrom. In general, the method includes the steps of:

inserting the optical fiber component into a heat sink substrate having a cavity for receiving a temperature-sensitive portion of the optical fiber component; and placing a heat sink cover in substantially mating relation with the heat sink substrate thereby enclosing the optical fiber component and packaging the optical fiber component.

The optical fiber component is inserted into the heat sink substrate of the heat sink packaging receptacle by placing the temperature-sensitive portion within the cavity provided in the heat sink substrate. If the heat sink substrate includes a channel that extends between the cavity and an end of the heat sink substrate, then an end portion of the optical fiber component is inserted within this channel placing it in intimate contact with the channel for dissipating heat power and/or optical power from the end portion of the optical fiber component. The optical fiber component may be positioned such that the cladding of the optical fiber component does not extend into the cavity so as to minimize the amount of excess heat that can enter the cavity. In the case where the temperature sensitive portion of the optical fiber component has had its coating/cladding stripped, i.e. removed, the previously uncoated/decladded section of the temperature-sensitive portion of the optical fiber component may be recoated/recladded prior to inserting the optical fiber component into the heat sink substrate.

To fix the optical fiber component to the heat sink substrate adhesive is placed at an adhesive bond site proximate an end of the heat sink substrate. If the heat sink substrate is provided with one or more channels, then the adhesive may be placed at an adhesive bond site that is located at the end of the channel most distal to the cavity. The adhesive that is used may be optically transparent and temperature resistant. It may also have a refractive index equal to or greater than a refractive index of the cladding/coating of the optical fiber component so as to remove excess power from the cladding/coating of the optical fiber component.

The corresponding method may also include the step of introducing a power-dissipative material inside the cavity, the power-dissipative material extending within the cavity and surrounding the temperature sensitive portion of the optical fiber component for dissipating heat power and/or optical power therefrom. This power-dissipative material may be introduced into the cavity in liquid form and allowed to solidify in place. Preferably, the power-dissipative material has a melting temperature that is low enough so as not to damage the optical fiber component. In the case of a heat sink substrate that includes at least one power-dissipating channel extending from the cavity, the cavity may be simply be filled with a heat-insensitive gas such as air or inert gas as nitrogen. No special technique is needed to insert ambient air. However, inserting an inert gas is preferably accomplished once the package is assembled. It may be injected into the cavity using a syringe or the packaging may be performed under an inert gas atmosphere to ascertain that the cavity becomes filled the inert gas.

To complete the packaging of the optical fiber component, a heat sink cover is placed in substantially mating relation with the heat sink substrate thereby enclosing the optical fiber component within the package.

As will be appreciated by one skilled in the art, the present invention provides efficient and simple devices to prevent thermal degradation of optical fiber components.

Advantageously, the present invention allows to dissipate heat power and/or optical power away from a temperature sensitive portion of the optical fiber component.

Also advantageously, the present invention allows for the removal of optical power propagating in a fiber cladding of the optical device component.

Advantageously, the present invention can reduce the risk of thermal degradation by putting the heat sink in direct contact with the materials subject to excessive heating while displacing the adhesive bonds at a sufficient distance away from critical areas.

Of course, numerous modifications could be made to the embodiments described above without departing from the scope of the present invention.

The invention claimed is:

1. A package for dissipating at least one of heat power or optical power from a cladding of an optical fiber component of a device, the package comprising:

a heat sink packaging receptacle for accommodating the optical fiber component, the heat sink packaging receptacle comprising:

a cavity for receiving a temperature sensitive portion of the optical fiber component;

a first end for accommodating an input end of the optical fiber component; and a second end for accommodating an output end of the optical fiber component; and a power-dissipative material having heat conducting properties and adapted for dissipating at least one of heat power or optical power from the cladding of the optical fiber component, the power-dissipative material extending within said cavity and surrounding the cladding of the optical fiber component along the temperature-sensitive portion thereof and being in contact with said cladding, said power-dissipative material being in a solid or liquid form.

2. A package according to claim 1, wherein the power-dissipative material comprises optically transparent material having a refractive index conducive to total-internal reflection optical guidance of light within the optical fiber component.

3. A package according to claim 1, wherein the power-dissipative material comprises optically transparent material for mode stripping having a refractive index equal to or greater than a refractive index of the cladding of the temperature-sensitive portion of the optical fiber component.

4. A package according to claim 1, wherein the power-dissipative material has an absorption capacity to absorb light escaping from the optical fiber component.

5. A package according to claim 1, wherein the power-dissipative material comprises gallium.

6. A package according to claim 1, wherein the power-dissipative material comprises a metal or metallic alloy.

7. A package according to claim 1, wherein the power-dissipative material is selected from the group comprising metals, metallic alloys, composites, low index polymers and epoxies.

8. A package according to claim 1, wherein the heat sink packaging receptacle further comprises at least one channel extending between the cavity and either the first end or the second end of the heat sink packaging receptacle, the channel being in intimate contact with a cladding of the optical fiber component for dissipating at least one of heat power or optical power from the optical fiber component.

9. A package according to claim 1, wherein the heat sink packaging receptacle further comprises:
an entry channel extending between the first end and the cavity, the entry channel being in intimate contact with the input end of the optical fiber component for dissipating at least one of heat power or optical power from the input end of the optical fiber component; and
an exit channel extending between the second end and the cavity, the exit channel being in intimate contact with the output end of the optical fiber component for dissipating at least one of heat power or optical power from the output end of the optical fiber component.

10. A package according to claim 1, further comprising an adhesive proximate each of the first end and the second end of the heat sink packaging receptacle for affixing the optical fiber component to the heat sink packaging receptacle.

11. A package according to claim 10, wherein the adhesive is optically transparent and temperature resistant.

12. A package according to claim 1, wherein the heat sink packaging receptacle comprises a heat sink substrate and a heat sink cover engaged in substantially mating relation to define the cavity.

13. A package according to claim 12, wherein the heat sink substrate and heat sink cover consist of a heat conductive metal or metallic alloy.

14. A package according to claim 13, wherein the heat conductive metal or metallic alloy comprises aluminum or copper.

15. A package for dissipating at least one of heat power or optical power from an optical fiber component of a device, the optical fiber component having a light-guiding core and a cladding surrounding the core, the package comprising:
a heat sink packaging receptacle for accommodating the optical fiber component, the heat sink packaging receptacle comprising:
a cavity for receiving a temperature-sensitive portion of the optical fiber component;
a first end for accommodating an input end of the optical fiber component;
a second end for accommodating an output end of the optical fiber component; and
at least one channel extending between the cavity and any one of the first end and the second end, the channel being in intimate contact with the cladding of the optical fiber component for dissipating at least one of heat power or optical power from the corresponding one of the input end and output end of the optical fiber component.

16. A package according to claim 15, further comprising an adhesive for affixing the optical fiber component to the heat sink packaging receptacle, the adhesive placed at an adhesive bond site that is located within the at least one channel and distally to the cavity.

17. A package according to claim 15, wherein the at least one channel comprises an entry channel extending between the first end and the cavity, and an exit channel extending between the second end and the cavity.

18. A package according to claim 17, further comprising an adhesive for affixing the optical fiber component to the heat sink packaging receptacle, the adhesive placed at adhesive bond sites that are located within the entry channel and the exit channel respectively, distally to the cavity.

19. A package according to claim 16 or claim 18, wherein the adhesive is optically transparent and temperature resistant.

20. A package according to claim 16 or claim 18, wherein the adhesive has a refractive index greater than a refractive index of the cladding of the optical fiber component.

21. A package according to claim 15, wherein the cavity comprises heat-insensitive gas surrounding the temperature-sensitive portion of the optical fiber component.

22. A package according to claim 21, wherein the heat-insensitive gas surrounding the temperature-sensitive portion of the optical fiber component is air or an inert gas.

23. A package according to claim 15, wherein the cavity contains a power-dissipative material for dissipating at least one of heat power or optical power, the power-dissipative material surrounding the temperature sensitive portion of the optical fiber component.

24. A package according to claim 15, wherein the heat sink packaging receptacle comprises a heat sink substrate and a heat sink cover engaged in substantially mating relation to define the cavity.

25. A package according to claim 24, wherein the heat sink substrate and heat sink cover consist of heat conductive metallic material.

26. A method of packaging a high-power optical fiber component of a device, the method comprising the steps of:
inserting the optical fiber component into a heat sink substrate having a cavity for receiving a temperature sensitive portion of the optical fiber component;
introducing a power-dissipative material inside the cavity, the power-dissipative material having heat conducting properties and extending within the cavity so as to contact and surround the temperature sensitive portion of the optical fiber component for dissipating at least one of heat power or optical power from a cladding of said optical fiber component, said power-dissipative material being in a solid or liquid form; and placing a heat sink cover in substantially mating relation with the heat sink substrate thereby enclosing the optical fiber component and packaging the optical fiber component.

27. A method of packaging according to claim 26, further comprising the step of fixing the optical fiber component to the heat sink substrate using adhesive at an adhesive bond site proximate an end of the heat sink substrate.

28. A method of packaging according to claim 26, wherein the step of inserting the optical fiber component further comprises inserting an end portion of the optical fiber component within a channel that extends between the cavity and an end of the heat sink substrate, the end portion being put in intimate contact with the channel.

29. A method of packaging according to claim 28, further comprising the step of fixing the optical fiber component to the heat sink substrate using adhesive at an adhesive bond site that is located within the channel distally to the cavity.

30. A method of packaging according to claim 27 or claim 29, wherein the adhesive is optically transparent and temperature resistant.

31. A method of packaging according to claim 26, wherein the step of introducing a power-dissipative material inside the cavity comprises liquid filling the power-dissipative material into the cavity and solidifying in place the power-dissipative material.

32. A method of packaging according to claim 26, further comprising a step, before the step of inserting the optical fiber component, of recoating a previously uncoated section of the temperature-sensitive portion of the optical fiber component.

33. A method of packaging a high-power optical fiber component of a device, the optical fiber component having a light-guiding core and a cladding surrounding the core, the method comprising the steps of:
  inserting the optical fiber component into a heat sink substrate having a cavity for receiving a temperature-sensitive portion of the optical fiber component and having at least one channel that extends between the cavity and an end of the heat sink substrate for receiving an end portion of the optical fiber component, the end portion being put in intimate contact with the at least one channel so as to dissipate at least one of heat power or optical power from the corresponding one of the input end and output end of the optical fiber component; and
  placing a heat sink cover in substantially mating relation with the heat sink substrate thereby enclosing the optical fiber component and packaging the optical fiber component.

34. A method of packaging according to claim 33, wherein the step of inserting the optical fiber component comprises positioning the optical fiber component such that the cladding of the optical fiber component does not extend into the cavity.

35. A method of packaging according to claim 33, further comprising the step of fixing the optical fiber component to the heat sink substrate using adhesive at an adhesive bond site that is located within the channel distal to the cavity.

36. A method of packaging according to claim 33, further comprising the step of introducing a heat-insensitive gas into the cavity.

37. A method of packaging according to claim 33, further comprising the step of introducing a power-dissipative material into the cavity, the power-dissipative material extending within the cavity and surrounding the temperature sensitive portion of the optical fiber component.

38. A method of packaging according to claim 37, wherein the step of introducing a power-dissipative material inside the cavity comprises liquid filling the power-dissipative material into the cavity and solidifying in place the power-dissipative material.

39. A method of packaging according to claim 33, further comprising a step, before the step of inserting the optical fiber component, of recoating a previously uncoated section of the temperature-sensitive portion of the optical fiber component.

* * * * *